United States Patent [19]

Rollason et al.

[11] 4,047,424
[45] Sept. 13, 1977

[54] APPARATUS FOR NON-DESTRUCTIVE LEAK TESTING OF PRIMARY ELECTROCHEMICAL CELLS

[75] Inventors: Peter H. Rollason, Cayuga; James M. Williams, Seneca Falls, both of N.Y.

[73] Assignee: GTE Sylvania Incorporated, Stamford, Conn.

[21] Appl. No.: 727,769

[22] Filed: Sept. 29, 1976

[51] Int. Cl.² .................. G01M 3/20; G01N 31/00
[52] U.S. Cl. ............................ 73/52; 23/230 L; 23/253 R; 73/40.7
[58] Field of Search ............ 73/40, 40.7, 41, 41.2, 73/45.5, 49.3, 52; 23/230 L; 429/90

[56] References Cited

U.S. PATENT DOCUMENTS

| | | | |
|---|---|---|---|
| 2,930,828 | 3/1960 | Herold | 429/90 |
| 3,505,775 | 4/1970 | Andersen et al. | 73/52 X |
| 3,981,701 | 9/1976 | Andersen et al. | 73/40.7 X |

*Primary Examiner*—Richard C. Queisser
*Assistant Examiner*—John S. Appleman
*Attorney, Agent, or Firm*—Norman J. O'Malley; William H. McNeill; Robert T. Orner

[57] ABSTRACT

Apparatus comprising a conveyor adapted to move a plurality of test receptacles along a given path. Spaced along the path are means for adding a test fluid to the receptacles; first means for checking a desired parameter of the test fluid; means for inserting a cell; second means for checking the fluid for changes after a sufficient digestion period; means for comparing the two readings; and means for removing the cell. Additional means can also be provided for emptying the test fluid and rinsing the receptacles.

4 Claims, 2 Drawing Figures

APPARATUS FOR NON-DESTRUCTIVE LEAK TESTING OF PRIMARY ELECTROCHEMICAL CELLS

BACKGROUND OF THE INVENTION

This invention relates to apparatus and more particularly to automatic apparatus for non-destructively leak testing hermetically sealed electrochemcial primary cells.

Previous methods have employed spot checking of cells by individual operators, a time consuming and expensive operation.

OBJECTS AND SUMMARY OF THE INVENTION

It is an object of the invention to enhance electrochemical cell leakage testing.

In is another object of the invention to provide apparatus for checking electrochemical cells.

These objects are accomplished in on aspect of the invention by the provision of apparatus comprising conveyor means adapted to move a plurality of test receptacles along a given path. Work stations are positioned along the path of the conveyor for performing the sequential functions of dispensing a test fluid into the receptacles, testing a parameter of the fluid, delivering a cell into the fluid, rechecking the fluid, comparing the readings of the fluid checks, and removing the cell. Additional means can also be provided for emptying the fluid and rinsing the receptacles. This apparatus provides for the semiautomation of cell testing and allows for 100 percent leak testing of cells.

DESCRIPTION OF THE PREFERRED EMBODIMENTS

For a better understanding of the present invention, together with other and further objects, advantages and capabilities thereof, reference is made to the following disclosure and appended claims in connection with the above described drawings.

Figure 1:
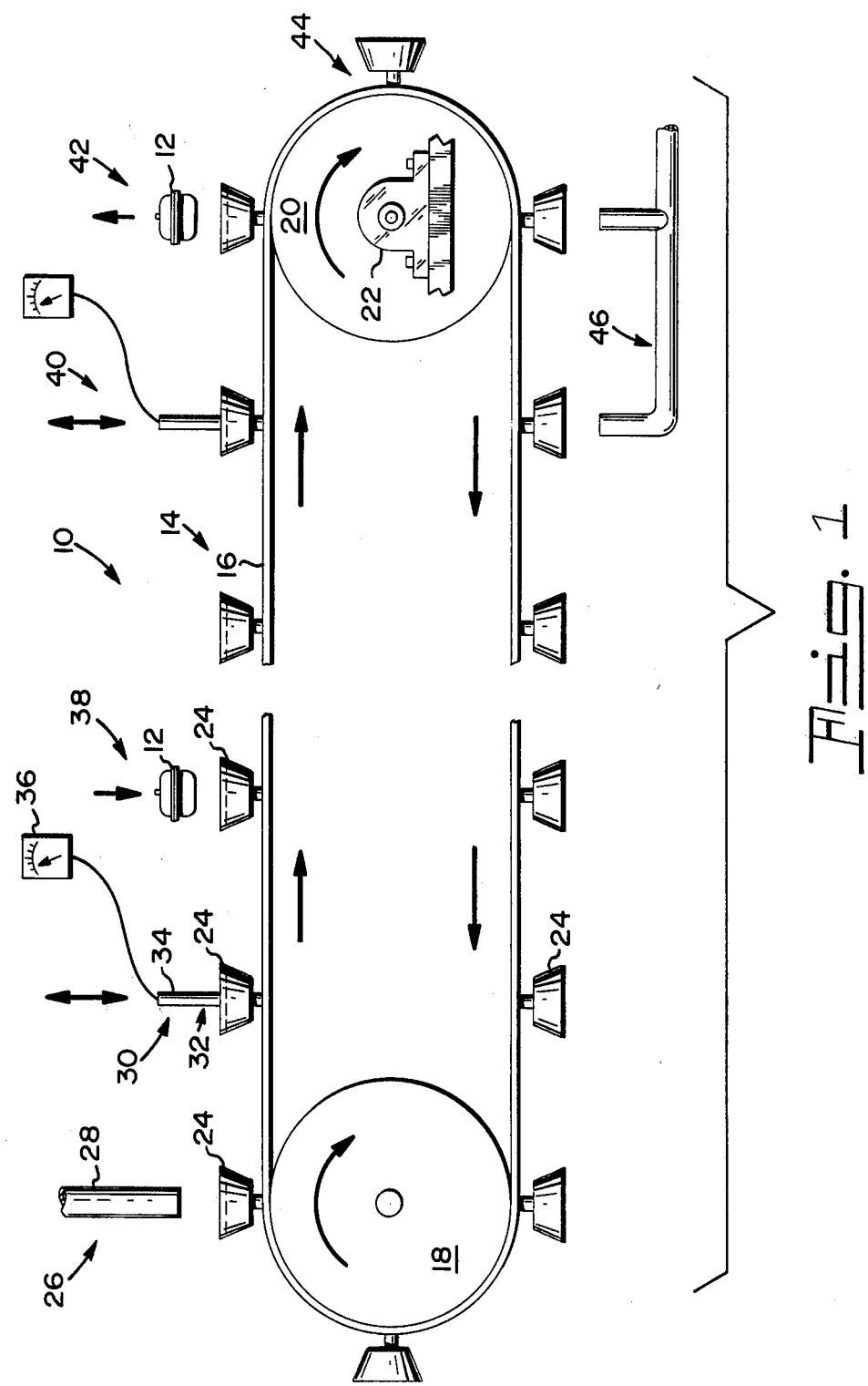
FIG. 1 is a diagrammatic view of the apparatus.

Referring now to the drawings with greater particularity, there is shown in FIG. 1 an apparatus 10 for leak testing electrochemical cells 12. Apparatus 10 comprises a conveyor 14 which can be in the form of an endless belt 16 stretched between rollers or pulleys 18 and 20. At least one of the rollers; e.g., 20 is driven as by motor 22. The belt speed, if continuous, should be relatively slow to allow for digestion periods of 1 to 60 minutes. The time is chosen according to the sensitivity required. Alternatively, the belt drive can be intermittent, as by use of a Geneva drive.

Conveyor 14 is provided with a plurality of equally spaced test receptacles 24 in the form of fluid receiving cups. A first work station 26 is positioned at an arbitrary starting point in the path of the conveyor 14 and comprises means 28 for dispensing a given amount of a test fluid into a test receptacle 24. The control for the fluid can be a metered valve arrangement or similar known system. The fluid itself must be electrically nonconductive and a suitable material is chemically pure, deionized water.

The second work station 30 is positioned adjacent the first work station 26 and downstream therefrom and comprises a first means 32 for checking a particular parameter of the test fluid; e.g., the chloride ion concentration if chloride ion is present in the cell electrolyte. The test check for electrolyte leakage, of course, will be based on one of the leakable components of the cell in all instances. The first checking means 32 can be in the form of a probe 34 and meter 36 for recording the test reading.

With the reading noted the conveyor progresses to a third work station 38 whereat a cell 12 is delivered into the test receptacle 24. Any suitable hand or automatic dispensing procedure can be utilized for the deposition of the cell.

A fourth work station 40 is positioned downstream from the third work station 38 a digestion distance which provides a period for a leakable component of the cell to enter the test fluid. The digestion distance can be a distance function or a time function. At the work station 40 the same parameter of the test fluid is again checked by means identical to that at the second work station 30; e.g., a probe 34 and a meter 36, and the results compared. An increase in the reading indicates that the cell is leaking and should be rejected.

A fifth work station 42 is then provided for removing the cell 12 for deposition in an acceptable or non-acceptable container.

The test fluid is then emptied from receptacles 24, as at 44 and the empty receptacles are then thoroughly rinsed as by means 46.

This apparatus is extremely easy to use and construct, yet it provides a means for 100 percent leak testing of hermetically sealed cells.

Figure 2:
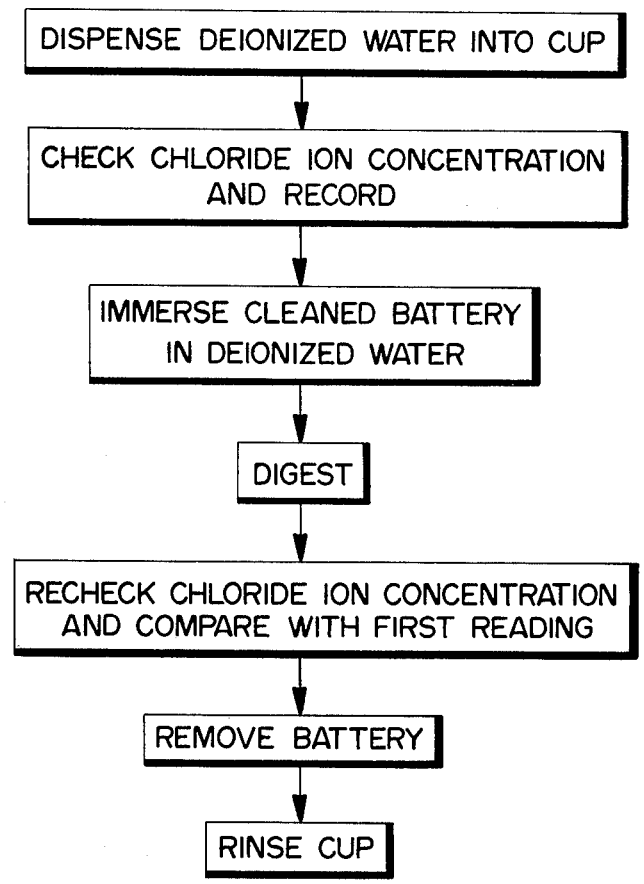
FIG. 2 is a flow diagram.

FIG. 2 provides a flow diagram of the sequence of operations and also brings out the point that the cells 12 should be cleaned before immersion in the receptacles 24 to insure that outside contamination is removed.

It should be noted that the apparatus is capable of working with any checkable parameter of a leaking cell; such as the aforementioned electrolyte component, the pH, the electrical conductivity of the test fluid, etc.

While there has been shown and described what are at present considered the preferred embodiments of the invention, it will be obvious to those skilled in the art that various changes and modifications may be made therein without departing from the scope of the invention as defined by the appended claims.

What is claimed is:

1. An apparatus for leak testing electrochemical cells comprising: conveyor means adapted to move a plurality of test receptacles along a given path; a first work station disposed at a starting point of said path comprising means for dispensing a test fluid into said test receptacles; a second work station adjacent said first work station and downstream therefrom comprising first means for checking at least one particular parameter of said test fluid; a third work station adjacent said second work station and downstream therefrom comprising means for delivering an electrochemical cell into said test receptacle containing said test fluid; a fourth work station disposed downstream from said third work station a digestion distance comprising a second means for checking said at least one particular parameter of said test fluid; means for comparing said first and second checks to determine if said cell leaked; and means for removing said cell.

2. The apparatus of claim 1 wherein means are provided for removing said test fluid after said cell has been removed.

3. The apparatus of claim 2 wherein means are provided for rinsing said test receptacles after said fluid has been removed.

4. The apparatus of claim 3 wherein said conveyor comprises an endless belt.

* * * * *